US012771744B2

(12) United States Patent
Lee et al.

(10) Patent No.: US 12,771,744 B2
(45) Date of Patent: Oct. 20, 2026

(54) ELECTRONIC DEVICE FOR PROVIDING BLOCKCHAIN-BASED SERVICE, AND OPERATION METHOD THEREOF

(71) Applicant: Samsung Electronics Co., Ltd., Suwon-si (KR)

(72) Inventors: Youna Lee, Suwon-si (KR); Youngkow Lee, Suwon-si (KR); Seongmin Je, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 4 days.

(21) Appl. No.: 18/469,936

(22) Filed: Sep. 19, 2023

(65) Prior Publication Data

US 2024/0015216 A1 Jan. 11, 2024

Related U.S. Application Data

(63) Continuation of application No. PCT/KR2022/003528, filed on Mar. 14, 2022.

(30) Foreign Application Priority Data

Mar. 19, 2021 (KR) ........................ 10-2021-0035768

(51) Int. Cl.
*H04L 67/1095* (2022.01)
*G06F 16/27* (2019.01)

(52) U.S. Cl.
CPC .......... *H04L 67/1095* (2013.01); *G06F 16/27* (2019.01); *G06F 16/273* (2019.01); *G06F 16/275* (2019.01); *G06F 16/278* (2019.01)

(58) Field of Classification Search
CPC ..... H04L 67/1095; H04L 67/01; G06F 16/27; G06F 16/273; G06F 16/275; G06F 16/278
See application file for complete search history.

(56) References Cited

U.S. PATENT DOCUMENTS 8,068,454 B2 11/2011 Bonta et al.
10,433,115 B1 10/2019 Levatte et al.
(Continued)

FOREIGN PATENT DOCUMENTS

KR 10-2010-0087207 A 8/2010
KR 10-1887894 B1 8/2018
(Continued)

OTHER PUBLICATIONS

Zhao et al., Blockchain-Based UDDI Data Replication and Sharing, 2018 IEEE 22nd International Conference on Computer Supported Cooperative Work in Design, Sep. 17, 2018.
(Continued)

*Primary Examiner* — Kavita Stanley
*Assistant Examiner* — Lin Lin M Htay
(74) *Attorney, Agent, or Firm* — Jefferson IP Law, LLP

(57) ABSTRACT

An electronic device is provided. The electronic device includes a processor, a wireless communication circuit, and memory to store instructions. The instructions are configured to, when executed by the processor, cause the electronic device to receive a short-range wireless communication signal from a first external electronic device, identify a blockchain service provided by a mesh network including the first external electronic device based on the short-range wireless communication signal, establish a peer-to-peer (P2P) connection with the first external electronic device, and perform block synchronization for the blockchain service through the P2P connection.

17 Claims, 15 Drawing Sheets

(56) References Cited

U.S. PATENT DOCUMENTS

| | | | | |
|---|---|---|---|---|
| 2019/0034465 | A1* | 1/2019 | Shimamura | G06Q 20/02 |
| 2019/0268730 | A1* | 8/2019 | Jung | H04W 4/08 |
| 2019/0349426 | A1* | 11/2019 | Smith | H04L 67/562 |
| 2019/0354518 | A1* | 11/2019 | Zochowski | G06F 16/2379 |
| 2020/0213127 | A1* | 7/2020 | Maniyar | G06F 16/2379 |
| 2020/0334204 | A1* | 10/2020 | Irazabal | G06F 16/1837 |
| 2021/0042132 | A1* | 2/2021 | Park | H04L 67/10 |

FOREIGN PATENT DOCUMENTS

| | | | |
|---|---|---|---|
| KR | 10-2018-0131965 | A | 12/2018 |
| KR | 10-1930825 | B1 | 12/2018 |
| KR | 10-1968424 | B1 | 4/2019 |
| KR | 10-2019-0118361 | A | 10/2019 |
| KR | 10-2030905 | B1 | 10/2019 |
| KR | 10-2037848 | B1 | 10/2019 |
| KR | 10-2020-0030345 | A | 3/2020 |
| KR | 10-2142259 | B1 | 8/2020 |
| KR | 10-2504930 | B1 | 3/2023 |
| KR | 10-2504931 | B1 | 3/2023 |
| WO | 2017/057988 | A1 | 4/2017 |

OTHER PUBLICATIONS

International Search Report dated Jul. 8, 2022, issued in international Application No. PCT/KR2022/003528.

Korean Office Action dated Mar. 12, 2026, issued in Korean Application No. 10-2021-0035768.

* cited by examiner

ELECTRONIC DEVICE FOR PROVIDING BLOCKCHAIN-BASED SERVICE, AND OPERATION METHOD THEREOF

CROSS-REFERENCE TO RELATED APPLICATION(S)

This application is a continuation application, claiming priority under § 365(c), of an International application No. PCT/KR2022/003528, filed on Mar. 14, 2022, which is based on and claims the benefit of a Korean patent application number 10-2021-0035768, filed on Mar. 19, 2021, in the Korean Intellectual Property Office, the disclosure of which is incorporated by reference herein in its entirety.

BACKGROUND

1. Field

The disclosure relates to an electronic device for providing a blockchain-based service and an operation method thereof.

2. Description of Related Art

A blockchain technology may allow a plurality of nodes to share a ledger and record a block generated through a calculation process of the plurality of nodes based on various consensus mechanisms in the ledger, thus facilitating decentralization of data and information.

Some of the plurality of nodes may be full nodes. For example, the full node may be a large-capacity server. The full node may be always connected with a network to store all pieces of information recorded in the ledger. The full node may verify blocks and transactions generated by a decentralized network or peer-to-peer (P2P). The full node includes a client which is software configured to perform an operation of the full node.

The plurality of nodes includes another types of nodes rather than the full node. For example, some of the plurality of nodes may be miner nodes. The miner node may generate a new block and may verify a transaction. For example, the others of the plurality of nodes may be light nodes. The light node may store a portion of the information recorded in the ledger. The light node may be connected with the full node to receive information recorded in the ledger from the full node if necessary.

The above information is presented as background information only to assist with an understanding of the disclosure. No determination has been made, and no assertion is made, as to whether any of the above might be applicable as prior art with regard to the disclosure.

SUMMARY

It may be difficult to implement a decentralized network including an electronic device (e.g., a mobile terminal) with high mobility.

For example, the mobile terminal may be always connected with the network and may fail to operate. When the mobile terminal accesses the network again, it may perform block synchronization to use a blockchain service.

In the block synchronization process, excessive power consumption may be caused in the mobile terminal. In addition, data usage of the mobile terminal increases in a process of communicating with another mobile terminal on the network, a billing program may occur.

Aspects of the disclosure are to address at least the above-mentioned problems and/or disadvantages and to provide at least the advantages described below. Accordingly, an aspect of the disclosure is to provide an electronic device for providing a blockchain-based service and an operation method thereof.

Additional aspects will be set forth in part in the description which follows and, in part, will be apparent from the description, or may be learned by practice of the presented embodiments.

In accordance with an aspect of the disclosure, an electronic device is provided. The electronic device includes a processor, a wireless communication circuit, and memory to store instructions. The instructions may be configured to, when executed by the processor, cause the electronic device to receive a short-range wireless communication signal from a first external electronic device, identify a blockchain service provided by a mesh network including the first external electronic device based on the short-range wireless communication signal, establish a peer-to-peer (P2P) connection with the first external electronic device, and perform block synchronization for the blockchain service through the P2P connection.

In accordance with another aspect of the disclosure, an operation method of an electronic device is provided. The operation method includes receiving a short-range wireless communication signal from a first external electronic device, identifying a blockchain service provided by a mesh network including the first external electronic device based on the short-range wireless communication signal, establishing a peer-to-peer (P2P) connection with the first external electronic device, and performing block synchronization for the blockchain service through the P2P connection.

According to embodiments disclosed in the disclosure, the electronic device may use a blockchain service based on a mesh network, thus reducing power consumption.

In addition, various effects ascertained directly or indirectly through the disclosure may be provided.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
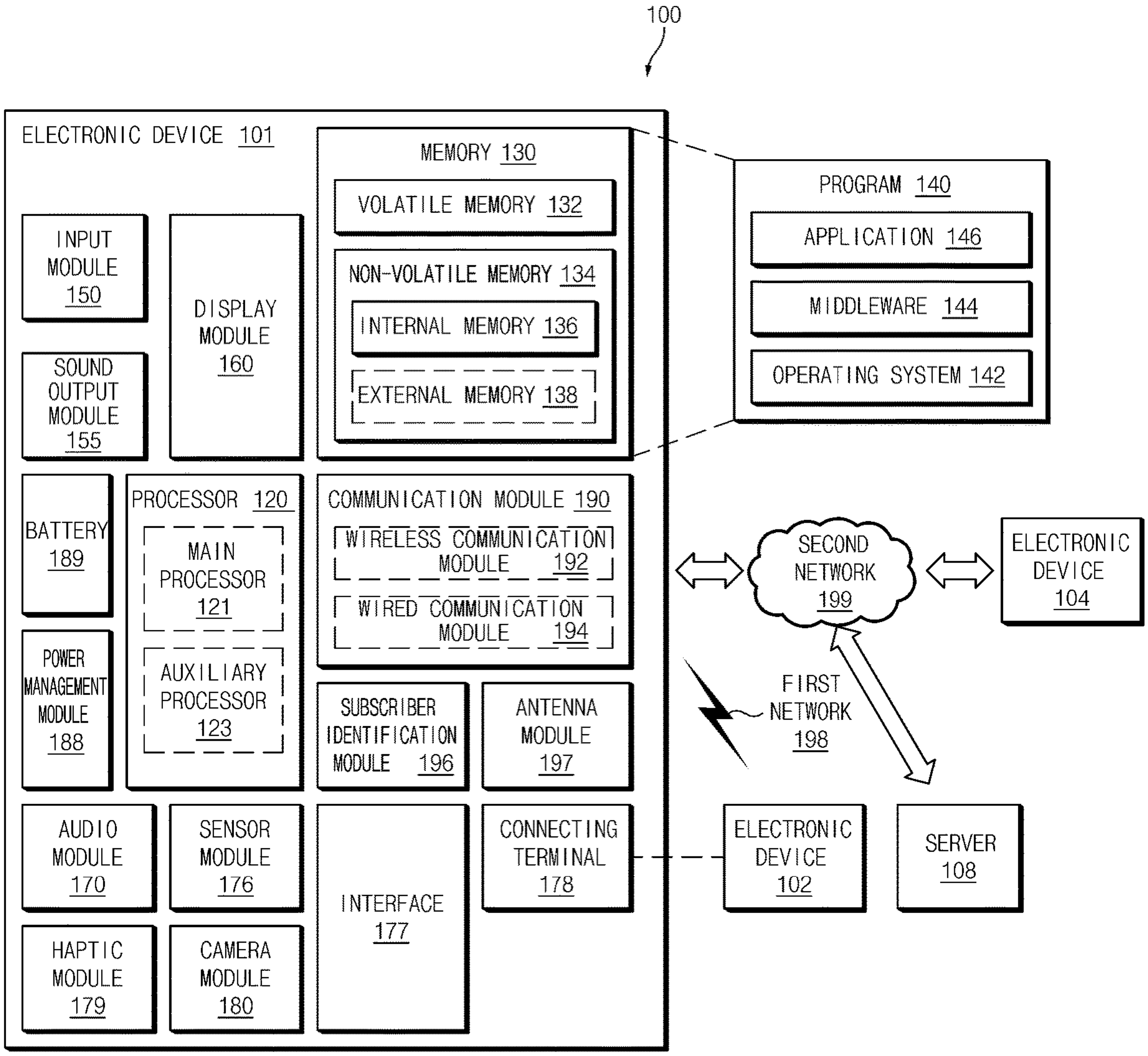
FIG. 1 is a block diagram illustrating an electronic device 101 in a network environment 100 according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semisupervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a fifth generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter wave (mmWave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 gigabits per second (Gbps) or more) for implementing eMBB, loss coverage (e.g., 164 decibels (dB) or less) for implementing mMTC, or U-plane latency (e.g., 0.5 milliseconds (ms) or less for each of downlink (DL) and uplink (UL), or a round trip of lms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102 or 104, or the server 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra-low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1$^{st}$" and "2$^{nd}$," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2A:
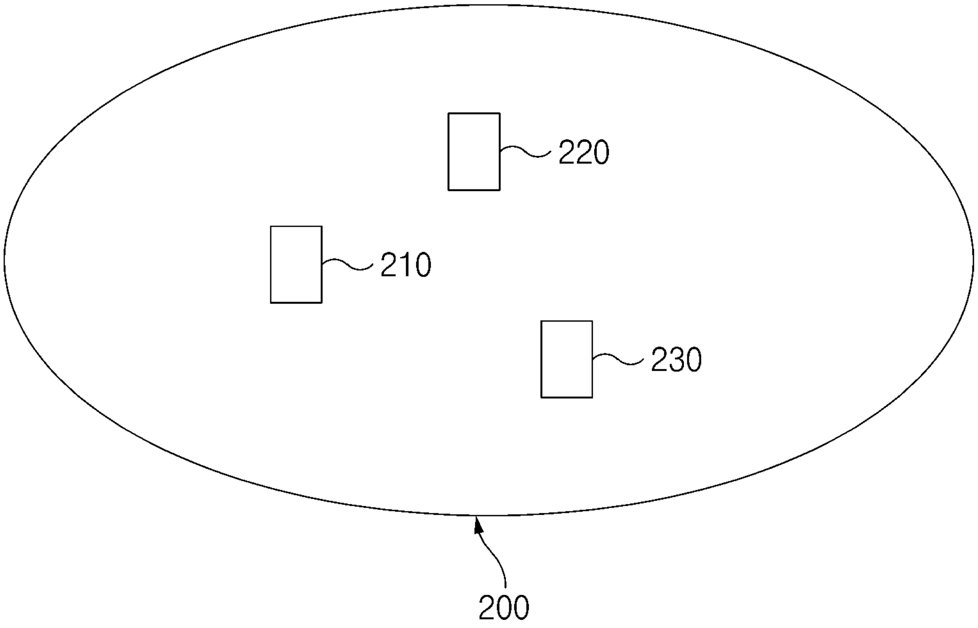
FIG. 2A illustrates a configuration of a network according to an embodiment of the disclosure.

FIG. 2A illustrates a configuration of a network according to an embodiment of the disclosure.

Figure 2B:
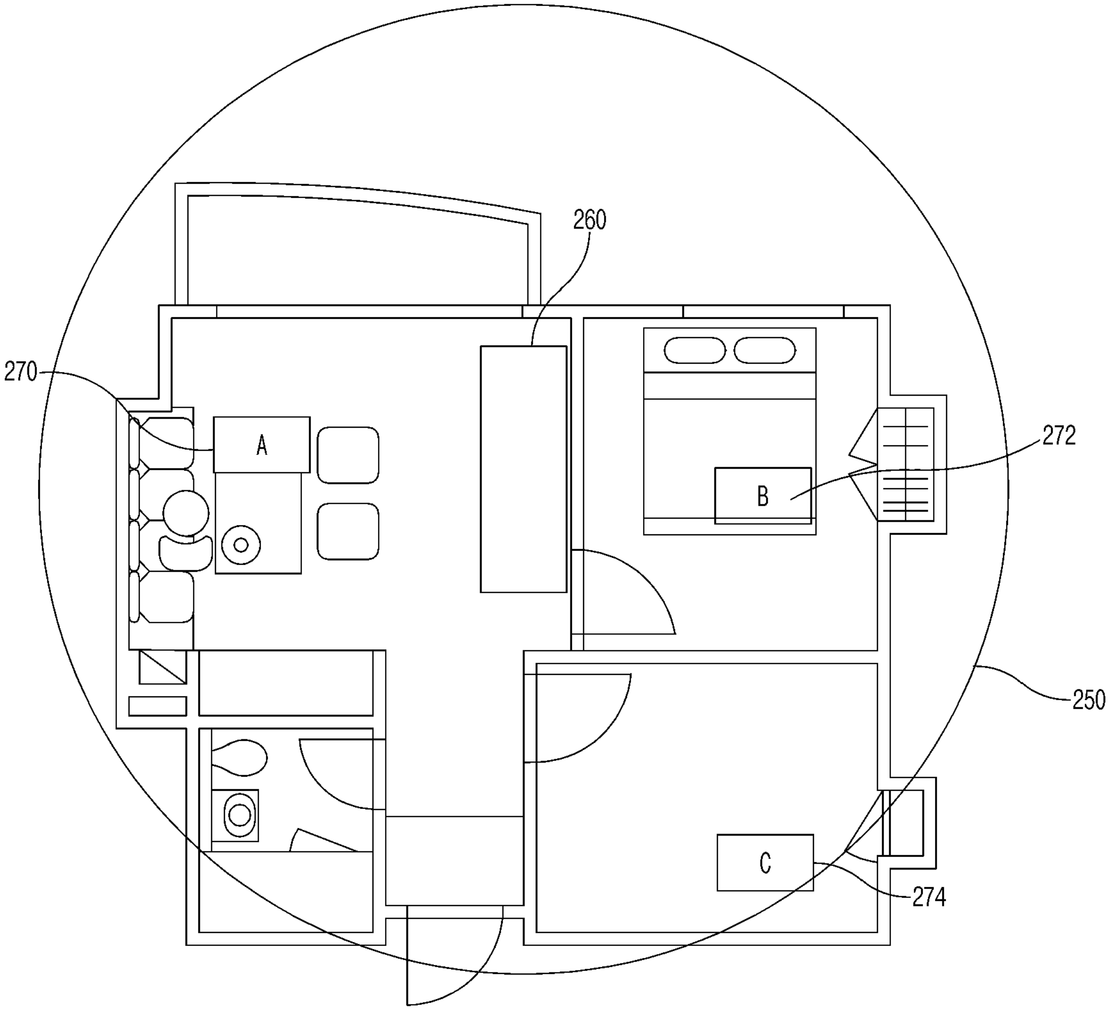
FIG. 2B illustrates a local network according to an embodiment of the disclosure.

FIG. 2B illustrates a local network according to an embodiment of the disclosure.

Referring to FIG. 2A, a plurality of electronic devices 210, 220, and 230 may configure a network 200 which provides a blockchain service. In an embodiment, the network 200 may be an ad-hoc network where multi-hop is possible. In another embodiment, the plurality of electronic devices 210, 220, and 230 may operate as blockchain nodes.

In yet another embodiment, the network 200 may be formed based on a Wi-Fi neighbor awareness networking protocol (hereinafter, NAN). The plurality of electronic devices 210, 220, and 230 may be electronic devices capable of performing communication based on the NAN.

According to the NAN, the plurality of electronic devices 210, 220, and 230 may transmit or receive a service discovery frame (SDF) during a specified duration. The specified duration may be referred to as a discovery window.

In yet another embodiment, the SDF may include a subscribe message and/or a publish message of an aware service. For example, the aware service is understood as a service associated with a communication connection based on the NAN.

The plurality of electronic devices 210, 220, and 230 may be subscribers or publishers based on the SDF. The subscriber may receive a service published by the publisher. The publisher may provide a service requested by the subscriber.

In yet another embodiment, when the plurality of electronic devices 210, 220, and 230 share a schedule of the discovery window, a set of the plurality of electronic devices 210, 220, and 230 may configure a cluster.

In yet another embodiment, the plurality of electronic devices 210, 220, and 230 may operate as any one of an anchor, a master, or a non-sync based on a master rank. An electronic device which stably participates in the cluster may have a master rank with a relatively high.

In yet another embodiment, at least one of the electronic devices which configures the cluster may operate as a master. An electronic device with the highest master rank among the electronic devices which operate as masters may operate as an anchor.

The electronic device which operates as the master may transmit a synchronization beacon to make the discovery windows of the electronic devices in the cluster be identical to each other. The synchronization beacon may be transmitted during a discovery window duration. The electronic device which operates as the master may transmit a discovery beacon to an electronic device which is not included in the cluster. The discovery beacon may be transmitted during a duration except for the discovery window duration.

In yet another embodiment, the electronic device which operates as the non-sync may transmit a synchronization beacon, but may fail to transmit a discovery beacon. In another embodiment, the electronic device which operates as the non-sync may fail to transmit both of a synchronization beacon and a discovery beacon.

In yet another embodiment, the electronic device 210 may operate as an anchor. For example, the electronic apparatus 210 is used at a fixed location. For example, the electronic device 210 is driven by a power source (e.g., a power source in home). For example, the electronic device 210 has a low possibility that it will deviate from the cluster. Hereinafter, it is assumed that the electronic device 210 always operates as the anchor.

In yet another embodiment, the electronic device 210 may be connected with a cellular network or a Wi-Fi network to perform communication with an external server (e.g., a server 108 of FIG. 1) of the network 200. For example, the external server configures a local network independent of the network 200. Alternatively, the electronic device 210 may communicate with the local network which provides the same blockchain service as a blockchain service provided by the network 200 through the external server.

In yet another embodiment, the electronic devices 220 and 230 may operate as masters or non-syncs. For example, the electronic devices 220 and 230 are electronic devices with high mobility. The electronic devices 220 and 230 irregularly deviates from the cluster or may irregularly return to the cluster. For example, the electronic device 220 and 230 are driven by an embedded battery (e.g., a lithium-ion battery). For example, the electronic devices 220 and 230 has a low possibility that it will be stably present in the cluster.

In yet another embodiment, the master rank may be updated at a certain period. The plurality of electronic devices 210, 220, and 230 may differently operate based on the updated master rank. For example, the electronic device 220 operates as the master and may then operate as the non-sync when the master rank is lowered.

In yet another embodiment, the electronic device 210 which operates as the anchor may be a full sync node. For example, the electronic device 210 stores all blocks generated in the blockchain service provided by the network 200. For example, the blockchain service is understood as a service provided using the blockchain network (e.g., the network 200).

In yet another embodiment, the electronic device 210 which operates as the anchor may be a publisher. The electronic device 210 may transmit a publish message to the other electronic devices 220 and 230 included in the network 200 or may receive a subscribe message from the other electronic devices 220 and 230 and may return the publish message.

In yet another embodiment, the electronic device 220 and 230 which operate as the masters or the non-syncs may be subscribers or publishers. In an embodiment, the electronic device 220 and 230 which operate as the masters or the non-syncs may be publishers at the same time as the subscribers.

In yet another embodiment, when the electronic device 220 is the subscriber, it may perform block synchronization to use the blockchain service provided by the network 200. The electronic device 220 may establish a peer-to-peer (P2P) connection with a publisher (e.g., the electronic device 210) in the network 200. The electronic device 220 may perform block synchronization through the P2P connection. In the block synchronization process, the electronic device 220 may establish a P2P connection with another electronic device (e.g., the electronic device 230) for block synchronization. A description will be given below of a block synchronization method.

In yet another embodiment, the electronic devices 220 and 230 may set a synchronization mode for the blockchain service. In an embodiment, the synchronization mode may be set based on a user input. In an embodiment, while performing the block synchronization, the electronic device 300 may provide a notification associated with the block synchronization.

Referring to FIG. 2B, a local network based on the NAN may provide a blockchain service. The local network may include a television (TV) 260 and a plurality of portable terminals 270, 272, and 274.

In an embodiment, the TV 260 may correspond to the electronic device 210. In another embodiment, the plurality of portable terminals 270, 272, and 274 may corresponding to the electronic device 220 and 230.

In yet another embodiment, the local network may provide an aware service in an area 250.

In yet another embodiment, the TV 260 may be a publisher of the aware service. For example, the TV 260 publishes an aware service in another electronic device (e.g., the plurality of portable terminals 270, 272, and 274) located in the area 250.

In yet another embodiment, the TV 260 may store a blockchain service list used by the plurality of portable terminals 270, 272, and 274.

In yet another embodiment, the plurality of portable terminals 270, 272, and 274 may enter and exit the area 250. For example, when the portable terminal 270 enters the area 250, the TV 260 publishes the aware service in the portable terminal 270. The portable terminal 270 may subscribe to the aware service provided by the TV 260. The portable terminal 270 may establish a P2P connection with the TV 260 and may perform block synchronization.

In yet another embodiment, the TV 260 may perform communication with an external server (e.g., a server 108 of FIG. 1) of the local network over a cellular network or a Wi-Fi network. For example, the external server configures a local network independent of the local network including the TV 260. For another example, the TV 260 may perform communication with the local network which provides the same blockchain service as the local network including the TV 260 through the external server.

In yet another embodiment, the TV 260 may perform block synchronization with the local network including the external server and/or the local network which provides the same blockchain service through the communication with the external server.

In yet another embodiment, when the portable terminal 270 deviates from the area 250, it may stop using the aware service. In another embodiment, the portable terminal 270 may deviate from the area 250 and may enter a local network area which provides the same blockchain service as the local network including the TV 260. The portable terminal 270 may perform block synchronization to use the same blockchain service as in the local network including the TV 260.

In yet another embodiment, the area 250 may be an aware service area or a Wi-Fi area. It is illustrated that the aware service area and the Wi-Fi area are identical to each other in FIG. 2B, but the aware service area and the Wi-Fi area may not identical to each other.

It is described that the electronic device 210 always operates as the anchor in FIG. 2A, but the electronic device (or the full sync node) which operates as the anchor may be variable in the network 200. For example, there is a low possibility that all the plurality of electronic devices 210, 220, and 230 included in the network 200 will be stably present in the cluster. For example, at least one of the plurality of electronic devices 210, 220, and 230 operates as the anchor based on the master rank, and the electronic device which operates as the anchor may vary over time.

Figure 3:
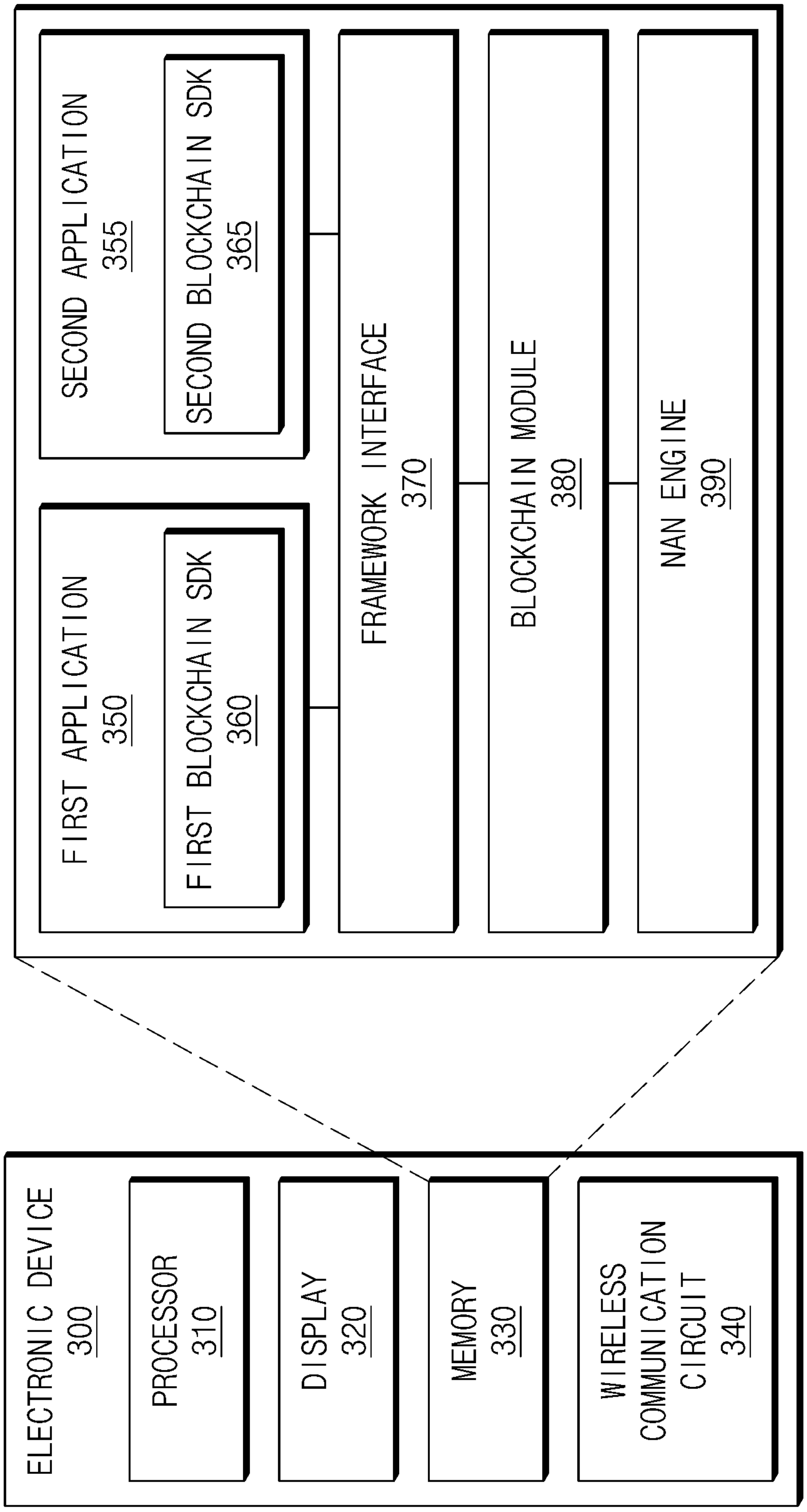
FIG. 3 is a block diagram illustrating a configuration of an electronic device according to an embodiment of the disclosure.

FIG. 3 is a block diagram illustrating a configuration of an electronic device according to an embodiment of the disclosure.

Figure 4:
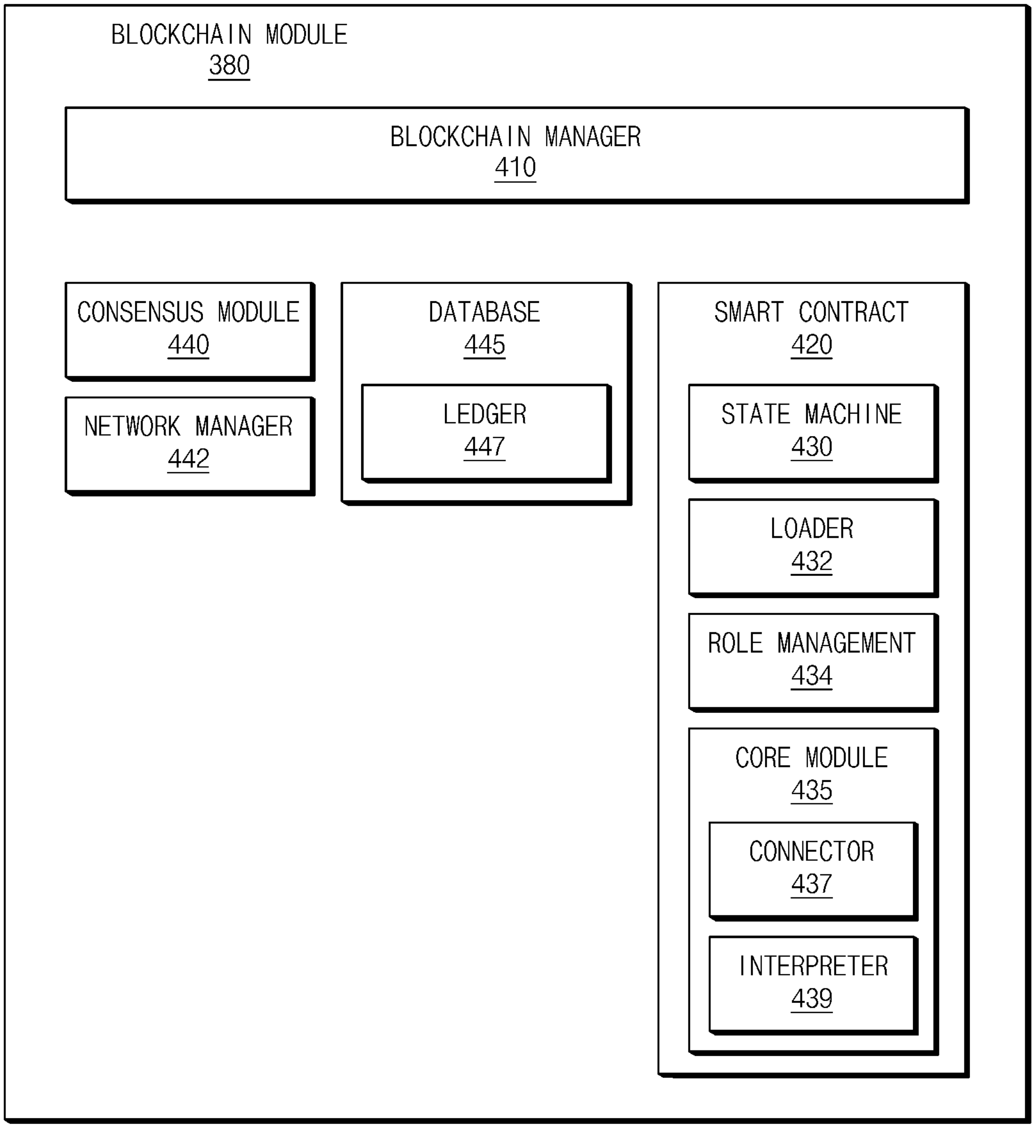
FIG. 4 illustrates a structure of a blockchain module according to an embodiment of the disclosure.

FIG. 4 illustrates a structure of a blockchain module according to an embodiment of the disclosure.

Figure 5:
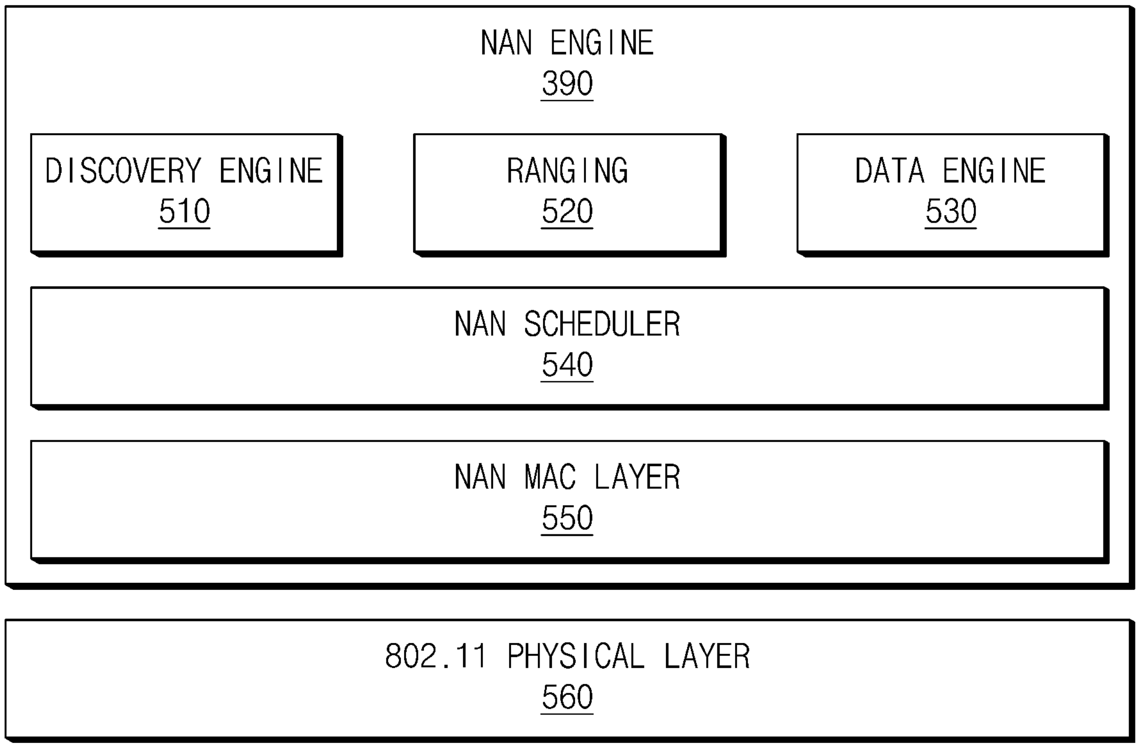
FIG. 5 illustrates a structure of a neighbor awareness networking (NAN) engine according to an embodiment of the disclosure.

FIG. 5 illustrates a structure of a NAN engine according to an embodiment of the disclosure.

Components of FIGS. 2A and 2B may be referenced to describe FIGS. 3 to 5.

Hereinafter, operations of an electronic device 300 may be substantially performed by a processor 310.

Referring to FIG. 3, the electronic device 300 may include the processor 310 (e.g., a processor of FIG. 1), a display 320 (e.g., a display module 160 of FIG. 1), a memory 330 (e.g., a memory 130 of FIG. 1), and/or a wireless communication circuit 340 (e.g., a communication module 190 of FIG. 1).

In an embodiment, the electronic device 300 may operate as a master or a non-sync. In another embodiment, the electronic device 300 may be a subscriber.

In yet another embodiment, the electronic device 300 may execute programs stored in the memory 330 to use a blockchain service. In yet another embodiment, the blockchain service may be provided by means of an application. In yet another embodiment, when a network 200 provides a plurality of blockchain services, the plurality of blockchain services may be provided by means of a plurality of applications respectively corresponding thereto.

In yet another embodiment, the memory 330 may include at least one application (e.g., a first application 350 and a second application 355), a framework interface 370, a blockchain module 380, and/or a NAN engine 390.

In yet another embodiment, the at least one application may provide blockchain services respectively corresponding thereto. For example, the first application 350 and the second application 355 supports different blockchain services.

In yet another embodiment, each of the at least one application may include a blockchain software development kit (SDK). For example, the first application 350 includes a first blockchain SDK 360. For example, the second application 355 includes a second blockchain SDK 365.

The first blockchain SDK 360 and the second blockchain SDK 365 may provide functions (e.g., a library and a debugger) necessary for the at least one application to interwork with the blockchain module 380 to drive the blockchain module 380.

In yet another embodiment, the framework interface 370 may provide an interface for allowing the at least one application to access the blockchain module 380.

In yet another embodiment, the blockchain module 380 may include programs (or codes) for implementing a blockchain technology.

Referring to FIG. 4, the blockchain module 380 may include a blockchain manager 410, a smart contract 420, a database 445, a consensus module 440, and/or a network manager 442.

In an embodiment, the blockchain manager 410 may manage an operation of the at least one application (e.g., the first application 350 and the second application 355).

In another embodiment, the smart contract 420 may include a state machine 430, a loader 432, role management 434, and a core module 435.

The state machine 430 may generate a sequence from the request of a transaction to the generation of the transaction. For example, the state machine 430 requests and load a code for performing the smart contract. The state machine 430 may call a smart contract method and may request the core module 435 to generate a transaction.

The loader 432 may load valid state data into the smart contract 420.

The role management 434 may manage an operation cycle (e.g., a synchronization mode) of the electronic device 300 associated with the blockchain service. For example, the electronic device 300 performs block synchronization based on the operation cycle. A description will be given below of the synchronization mode.

In yet another embodiment, the core module 435 may form a block of a transaction generated by the smart contract 420 based on a consensus algorithm. In yet another embodiment, the core module 435 may propagate the transaction, which is formed as the block, to other nodes (e.g., a plurality of electronic devices 210, 220, and 230) configuring a network 200. For example, the core module 435 is a blockchain open platform (e.g., an Ethereum open platform, a hyperledger, or a multichain). The core module 435 may perform block synchronization.

In yet another embodiment, the core module 435 may include a connector 437 and/or an interpreter 439.

The connector 437 may connect the core module 435 with the database 445 for data exchange.

The interpreter 439 may execute a code of the smart contract 420.

In yet another embodiment, the database 445 may be a set of pieces of data associated with the blockchain. The database 445 may include a ledger 447.

The ledger 447 may have a data structure in which a plurality of blocks are connected with each other. In yet another embodiment, each of the plurality of blocks may include information (e.g., a hash value) of a previous block to have the data structure in which the plurality of blocks are connected with each other. In yet another embodiment, each of the plurality of blocks may include a plurality of transactions. In yet another embodiment, the ledger 447 may be a portion of a ledger stored in the network 200.

In the embodiment, the consensus module 440 may perform a consensus mechanism. The consensus module 440 may include a consensus algorithm. For example, the consensus algorithm includes at least one of a practical byzantine fault tolerance algorithm (PBFT), a proof of work (PoW) algorithm, a proof of stake (PoS) algorithm, or a delegated PoS algorithm.

In yet another embodiment, the network manager 442 may manage data exchange with the NAN engine 390.

Referring to FIG. 5, the NAN engine 390 may perform communication based on the NAN. The NAN engine 390 may run based on an 802.11 physical layer 560. For example, the synchronization beacon transmitted by the electronic device 300 is defined by the institute of electrical and electronics engineers (IEEE) 802.11 specification. Hereinafter, operations of the NAN engine 390 may be substantially performed by the wireless communication circuit 340.

In yet another embodiment, the NAN engine 390 may include a discovery engine 510, ranging engine 520, a data engine 530, a NAN scheduler 540, and/or NAN medium access control (MAC) 550.

The discovery engine 510 may provide a subscribe and publish basic algorithm provided by the NAN cluster. For example, the discovery engine 510 transmits an SDF during a discovery window duration.

The ranging engine 520 may perform ranging based on an aware service discovery frame. For example, the aware service is provided in a ranging area. Herein, ranging may be a physical area where a signal associated with the aware service is able to be reached.

The data engine 530 may process data exchanged through NAN communication by the electronic device 300.

The NAN scheduler 540 may manage operations performed by the cluster and/or resources of the cluster.

The NAN medium access control (MAC) 550 may be involved in maintaining the cluster. For example, the NAN MAC 550 is involved in creating, joining, or merging the cluster.

Referring again to FIG. 3, the electronic device 300 may receive a short-range wireless communication signal from an external electronic device (e.g., a publisher) included in the network 200.

In yet another embodiment, the short-range wireless communication signal may include information associated with the aware service. For example, the short-range wireless communication signal includes a publish message of the aware service. In this case, the electronic device 300 may operate as a subscriber.

In yet another embodiment, the short-range wireless communication signal may include information about the blockchain service provided by the network 200 including the external electronic device.

In yet another embodiment, when the blockchain service provided by the network 200 is a blockchain service available to the electronic device 300, the electronic device 300 may establish a P2P connection with the external electronic device based on the short-range wireless communication signal. In yet another embodiment, the electronic device 300 may configure the network 200 based on the P2P connection with the external electronic device.

In yet another embodiment, the electronic device 300 may execute an application (e.g., the first application 350 and the second application 355) to use the blockchain service. In yet another embodiment, the electronic device 300 may provide a screen of the application on the display 320. In yet another embodiment, the electronic device 300 may provide a notification and/or a user interface (UI) associated with the blockchain service on the display 320. In yet another embodiment, the electronic device 300 may receive a user input associated with the blockchain service through the display 320.

In yet another embodiment, the electronic device 300 may perform block synchronization through the P2P connection to use the blockchain service. The block synchronization may be performed based on the synchronization mode. A description will be given below of the synchronization mode.

In yet another embodiment, the electronic device 300 may include a processor 310, a wireless communication circuit 340, and a memory 330 which is operatively connected with the processor 310, the wireless communication circuit 340, and a display 320 to store instructions. The instructions may be configured to, when executed by the processor 310, cause the electronic device 300 to receive a short-range wireless communication signal from a first external electronic device, identify a blockchain service provided by a mesh network including the first external electronic device based on the short-range wireless communication signal, establish a peer-to-peer (P2P) connection with the first external electronic device, and perform block synchronization for the blockchain service through the P2P connection. For example, the short-range wireless communication signal is based on a Wi-Fi neighbor awareness networking (NAN) protocol.

In yet another embodiment, the instructions may be configured to, when executed by the processor 310, cause the electronic device 300 to configure a mesh network (e.g., 200) with one or more external electronic devices (e.g., 210, 220, and 230). The first external electronic device may be included in the one or more external electronic devices.

In yet another embodiment, the instructions may be configured to, when executed by the processor 310, cause the electronic device 300 to, when performing the block synchronization: request a latest sequence number from at least one external electronic device among the one or more external electronic devices, receive the latest sequence number from each of the at least one external electronic device, identify a second external electronic device which transmits a highest sequence number, based on the received at least one latest sequence number, and request synchronization block data from the second external electronic device.

In yet another embodiment, the instructions may be configured to, when executed by the processor 310, cause to the electronic device 300 to establish a P2P connection with the second external electronic device, based on requesting the synchronization block data, and receive the synchronization block data through the P2P connection. For example, the synchronization block data includes data of blocks after the latest sequence number of the electronic device 300.

In yet another embodiment, the instructions may be configured to, when executed by the processor 310, cause to the electronic device 300 to update a ledger 447 stored in the memory 330, based on the synchronization block data.

In yet another embodiment, the instructions may be configured to, when executed by the processor 310, cause to the electronic device 300 to identify a synchronization mode of the electronic device 300 based on a user input and perform block synchronization based on the synchronization mode.

In yet another embodiment, the electronic device 300 may further include the display 320. The instructions may be further configured to, when executed by the processor 310, cause to the electronic device 300 to provide the display 320 with a notification associated with the block synchronization.

In yet another embodiment, the instructions may be configured to, when executed by the processor 310, cause to the electronic device 300 to use a first blockchain service in a first mesh network, establish a P2P connection with a third external electronic device which provides a second blockchain service, based on that the electronic device 300 enters an area where the second blockchain service provided by a second mesh network is provided, and perform block synchronization for the second blockchain service through the P2P connection.

Figure 6:
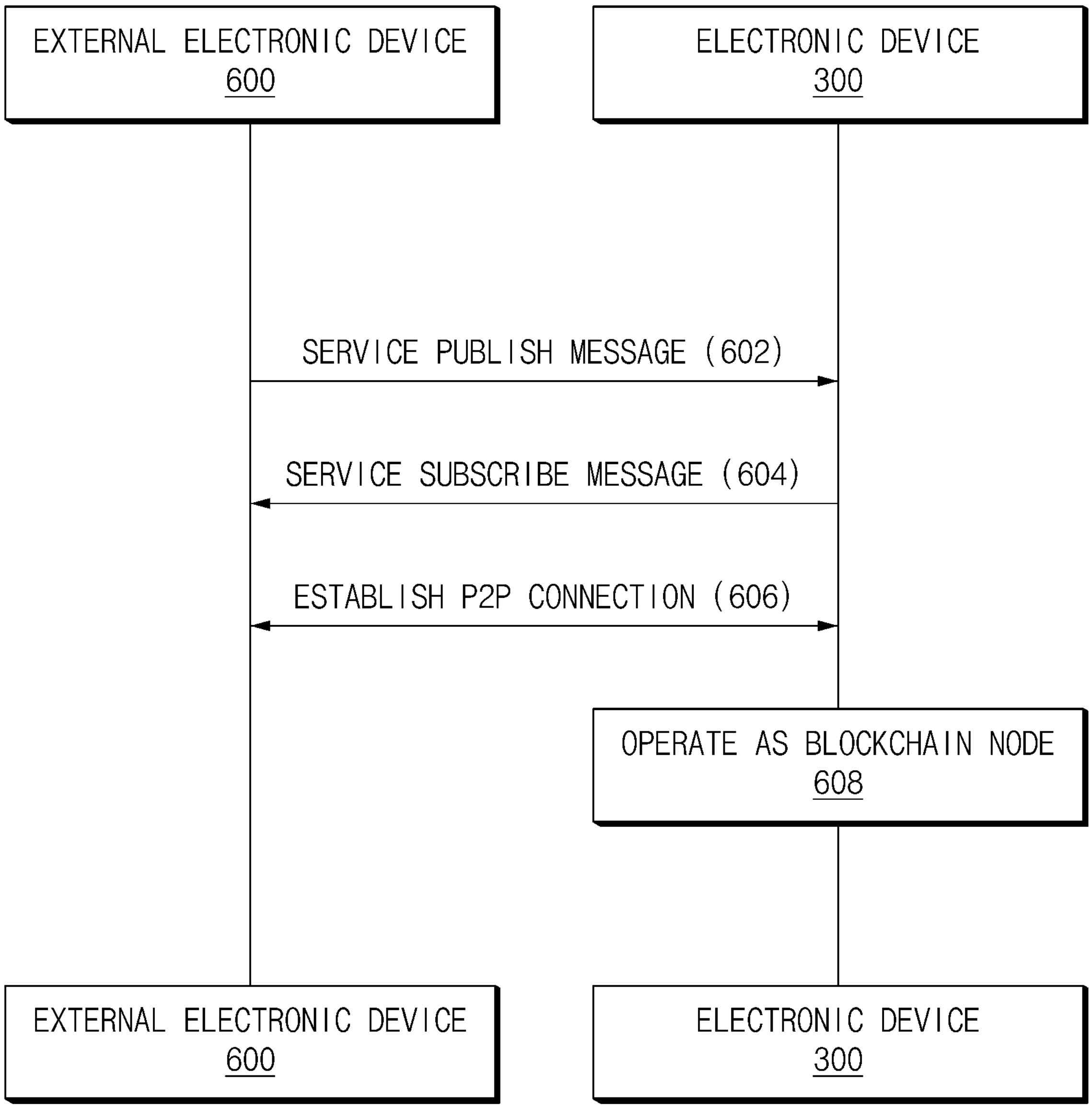
FIG. 6 illustrates establishing a P2P connection of an electronic device with an external electronic device according to an embodiment of the disclosure.

FIG. 6 illustrates establishing a P2P connection of an electronic device with an external electronic device according to an embodiment of the disclosure.

Components of FIGS. 2A, 2B, and 3 to 5 may be referenced to describe FIG. 6.

In an embodiment, an external electronic device 600 may correspond to an electronic device 210 or a TV 260. The external electronic device 600 may be a publisher of an aware service.

In another embodiment, an electronic device 300 may correspond to electronic devices 220 and 230 or a plurality portable terminals 270, 272, and 274. The external electronic device 600 may be the publisher of the aware service.

In yet another embodiment, the external electronic device 600 may store identification information of the electronic device 300 and/or a blockchain service list available to the electronic device 300. When the electronic device 300 enters an aware service area published by the external electronic device 600, the external electronic device 600 may transmit a publish message to the electronic device 300 in operation 602.

In yet another embodiment, the electronic device 300 may transmit a subscribe message to the external electronic device 600 in response to the publish message in operation 604.

In yet another embodiment, the electronic device 300 and the external electronic device 600 may establish a P2P connection in operation 606. The P2P connection may be based on NAN.

In yet another embodiment, the P2P connection may be a portion of a network (e.g., a network 200). In an embodiment, the electronic device 300 and the external electronic device 600 may configure the network. In an embodiment, the electronic device 300 and one or more external electronic devices may configure the network. The external electronic device 600 may be included in the one or more external electronic devices.

In yet another embodiment, the electronic device 300 may operate as a node of a blockchain system in the network in operation 608. The electronic device 300 may require block synchronization to use a blockchain service.

In yet another embodiment, the electronic device 300 may propagate a signal for the block synchronization to the one or more external electronic devices included in the network.

In yet another embodiment, data exchange for the block synchronization may be performed by a NAN engine 390. In an embodiment, the operation in the electronic device 300 associated with the block synchronization may be performed by a blockchain module 380. A description will be given below of a block synchronization method.

In yet another embodiment, the electronic device 300 may receive data for the block synchronization based on a NAN protocol to reduce power consumption.

Figure 7:
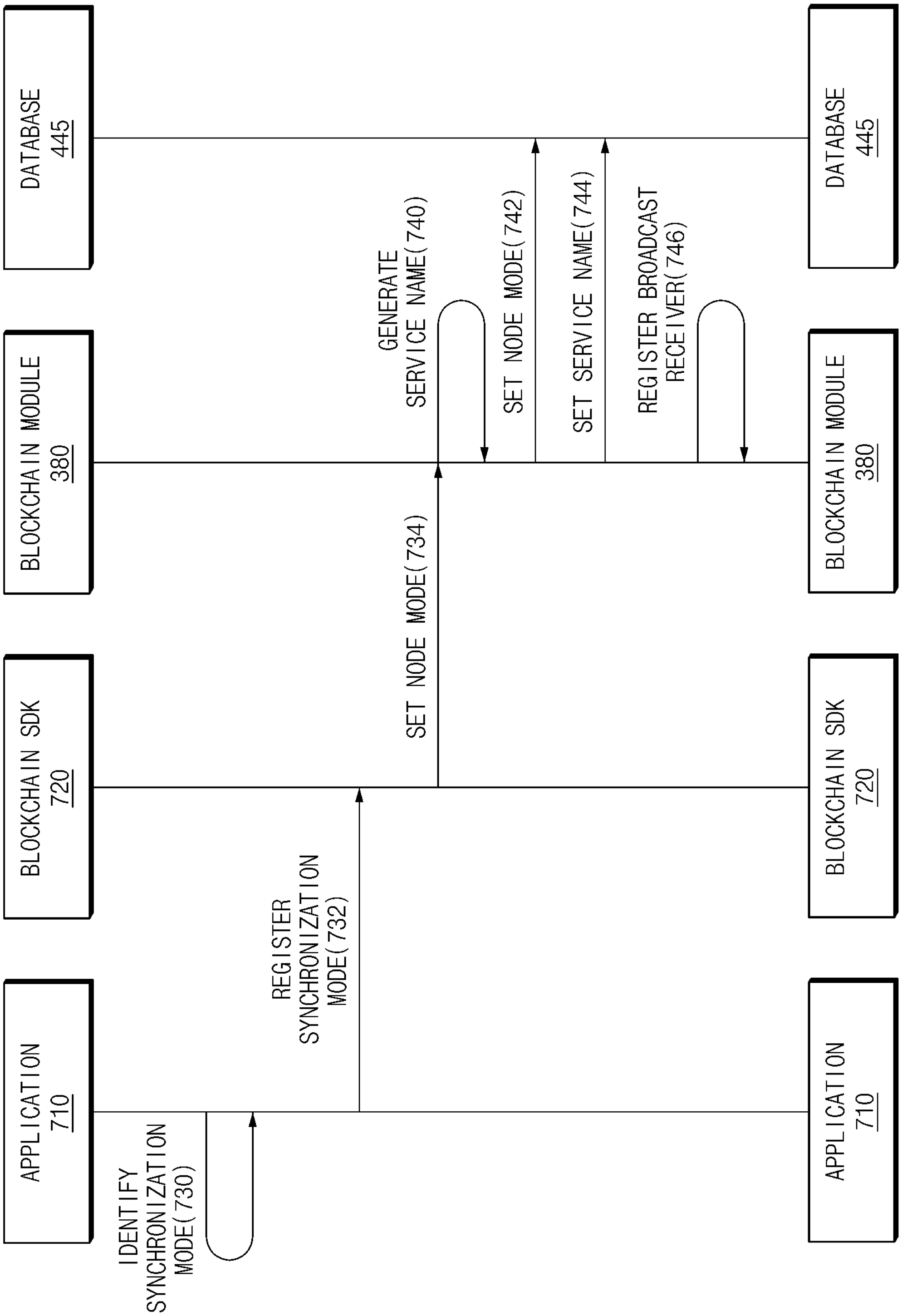
FIG. 7 is a signal sequence diagram in an electronic device for describing a role setting of an electronic device according to an embodiment of the disclosure.
Figure 8:
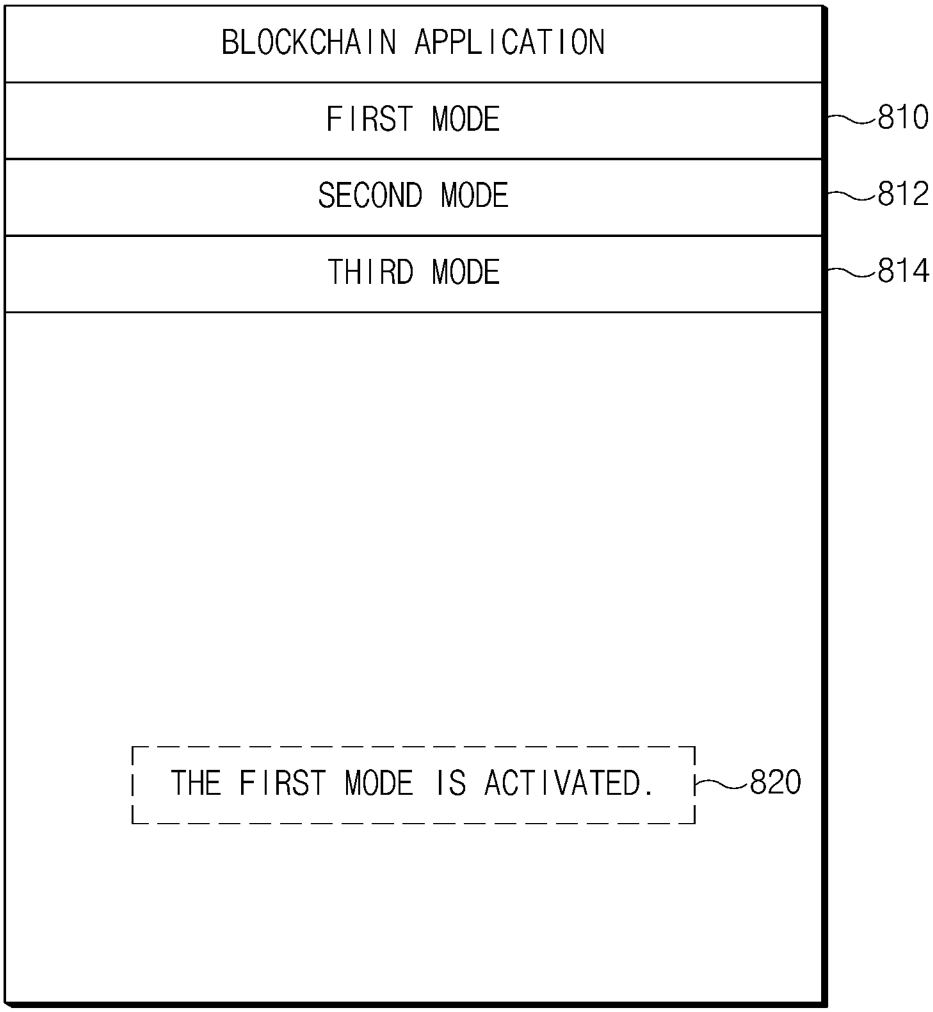
FIG. 8 illustrates a user interface (UI) associated with a synchronization mode according to an embodiment of the disclosure.

FIG. 7 is a signal sequence diagram in an electronic device for describing a role setting of an electronic device according to an embodiment of the disclosure. FIG. 8 illustrates a UI associated with a synchronization mode according to an embodiment of the disclosure.

Components of FIGS. 2A, 2B, and 3 to 6 may be referenced to describe FIGS. 7 and 8.

Referring to FIG. 7, an electronic device 300 may execute an application 710 to use a blockchain service. The electronic device 300 may provide a UI for setting a synchronization mode on a screen of an application 710. The electronic device 300 may receive a user input to the UI. The electronic device 300 may identify a synchronization mode for the blockchain service provided through the application 710 based on the user input in operation 730.

Referring to FIG. 8, a screen 800 of the application 710 may include user interfaces (UIs) 810, 812, and 814 associated with the synchronization mode. For example, the UI 810 corresponds to a first mode, the UI 812 may correspond to a second mode, and the UI 814 may correspond to a third mode.

In yet another embodiment, the electronic device 300 may perform block synchronization through the P2P connection in a local network including the electronic device 300. In another embodiment, the electronic device 300 may perform block synchronization with an external local network which provides the same blockchain network through communication with an external server (e.g., a cellular network or a Wi-Fi network). In yet another embodiment, the electronic device 300 may perform block synchronization based on a synchronization mode. In yet another embodiment, the first mode may be understood as an operation mode for performing block synchronization when a P2P connection is established with a publisher, regardless of a communication environment of the electronic device 300. For example, the electronic device 300 in the first mode performs block synchronization with the external local network over the cellular network or the Wi-Fi network.

In yet another embodiment, the second mode may be understood as an operation mode for not performing block synchronization when the electronic device 300 is connected with the cellular network and performing the block synchronization when the electronic device 300 is connected with the Wi-Fi network. For example, the electronic device 300 in the second mode performs block synchronization with the external local network over the Wi-Fi network.

In yet another embodiment, the third mode may be understood as an operation mode for providing a user with a UI (or notification) for whether to perform block synchronization when a P2P connection is established with a publisher and performing the block synchronization based on a user input to the UI.

In yet another embodiment, when identifying a user input to any one of the UIs 810, 812, and 814, the electronic device 300 may display a notification 820 on one area of the display 320. The notification 820 may include information about the identified synchronization mode.

Referring again to FIG. 7, the application 710 may register the synchronization mode in operation 732 identified in operation 730 in a blockchain SDK 720.

In an embodiment, the blockchain SDK 720 my set a node mode (or a synchronization mode) in operation 734 in a blockchain module 380.

In another embodiment, the blockchain module 380 may generate a name of a blockchain service in operation 740.

In yet another embodiment, the blockchain module 380 my set a node mode (or a synchronization mode) in operation 742 in a database 445. For example, a blockchain manager 410 sets a node mode in role management 434. The role management 434 may deliver the set node mode to the database 445.

In yet another embodiment, the blockchain module 380 may register a service name in operation 746 in the database 445 in operation 744. For example, the service name is understood as an identifier (e.g., AWARE_FILE_SHARE-_SERVICE_NAME) for identifying an aware service provided based on the NAN.

In yet another embodiment, the blockchain module 380 may register the electronic device 300 as a broadcast receiver. For example, when the electronic device 300 is registered as the broadcast receiver, the blockchain module 380 receives data (e.g., ACTION_WIFI_AWARE_STAT-E_CHANGED) indicating whether the NAN is available from a NAN engine 390.

Figure 9A:
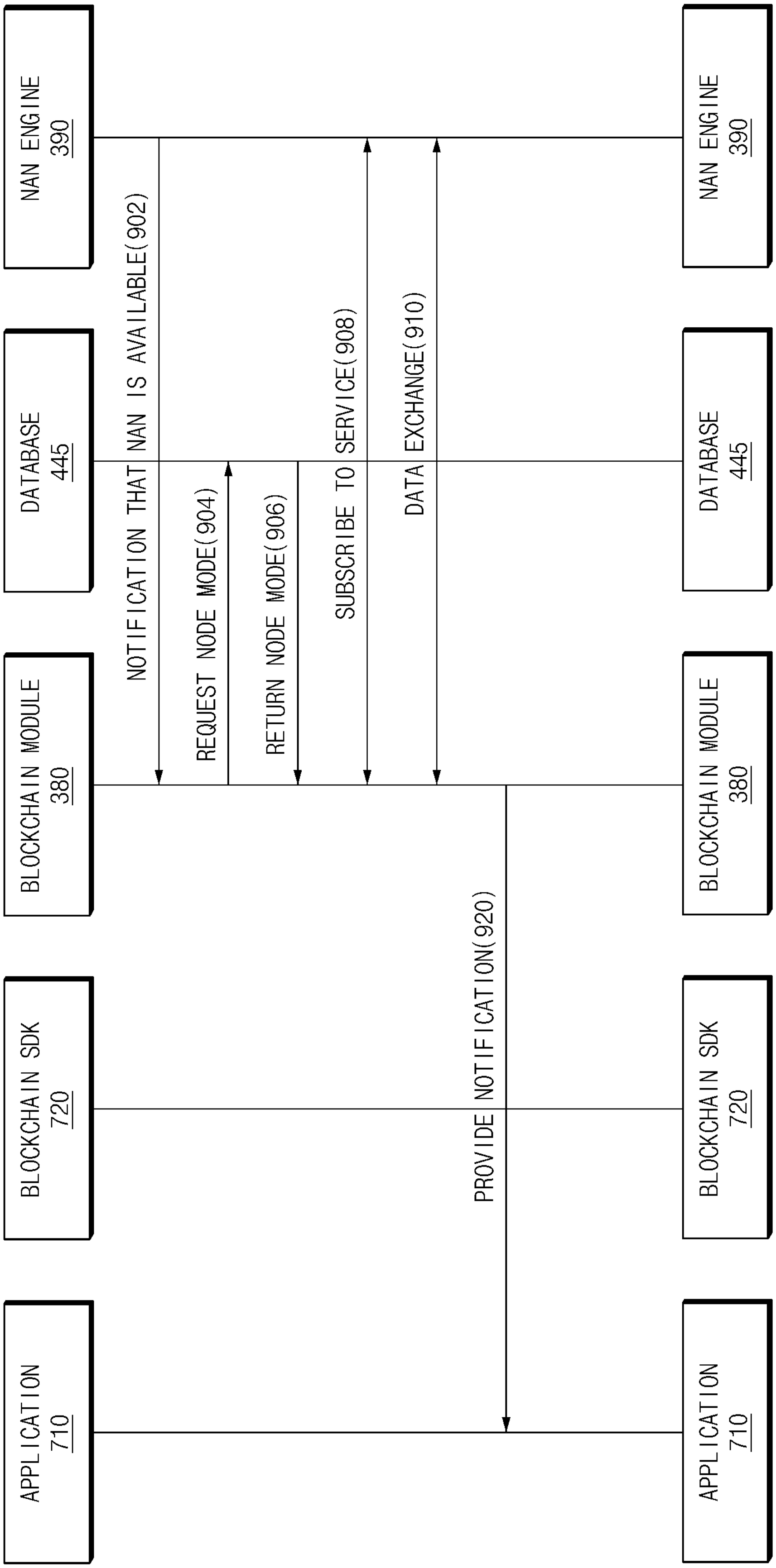
FIG. 9A is a signal sequence diagram in an electronic device for describing block synchronization, when an electronic device is in a first mode, according to an embodiment of the disclosure.
Figure 9B:
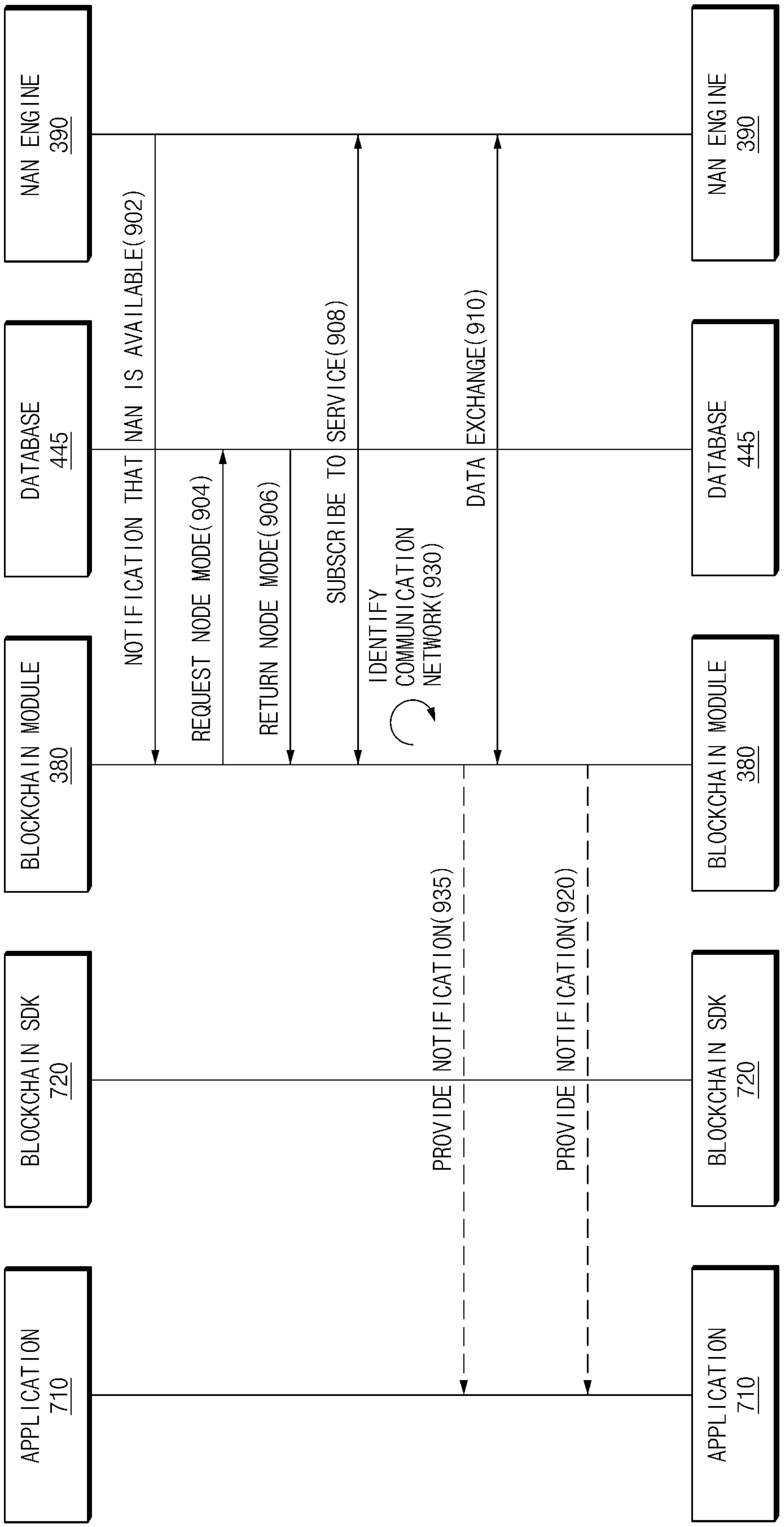
FIG. 9B is a signal sequence diagram in an electronic device for describing block synchronization, when an electronic device is in a second mode, according to an embodiment of the disclosure.
Figure 9C:
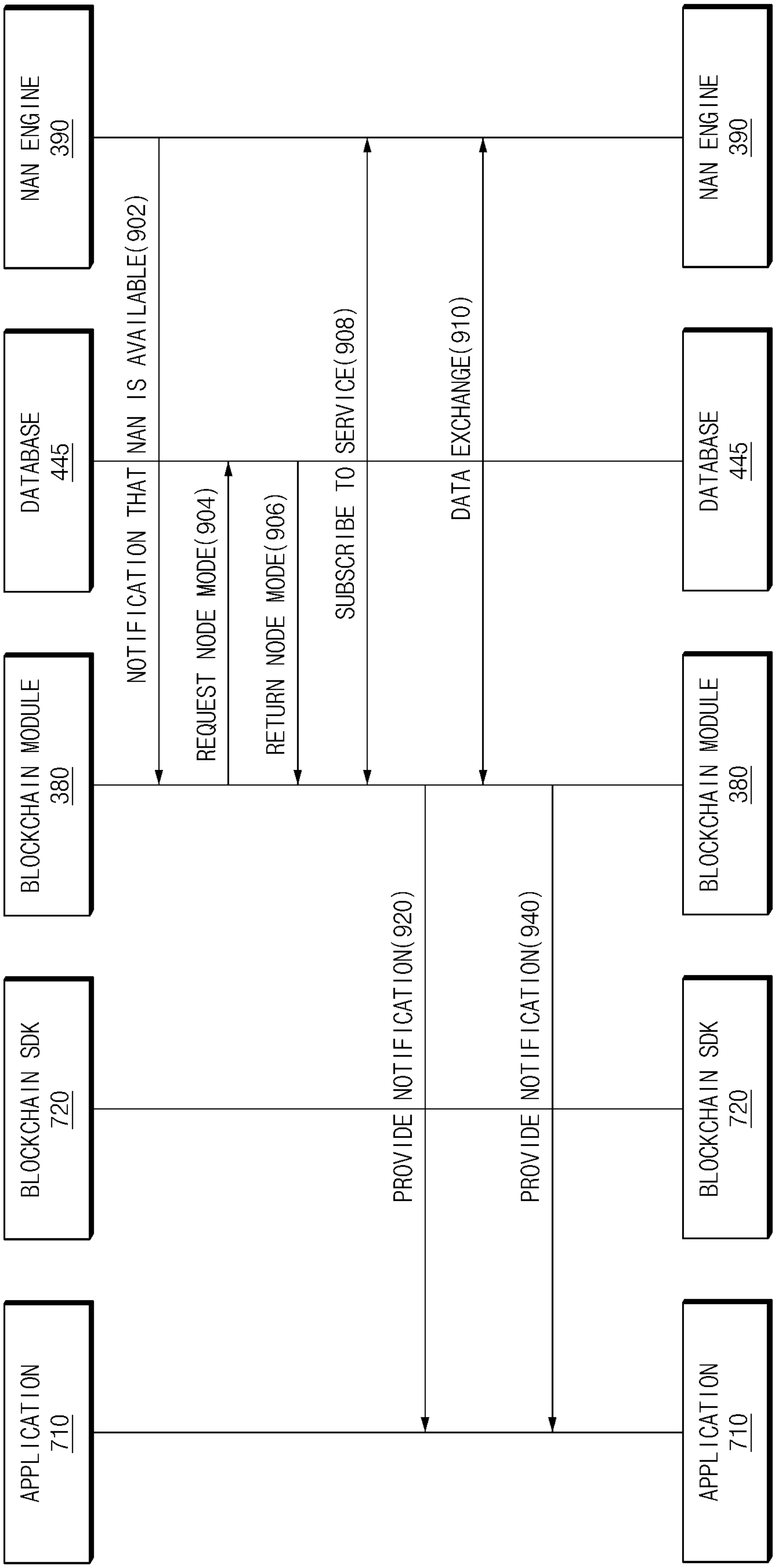
FIG. 9C is a signal sequence diagram in an electronic device for describing block synchronization, when an electronic device is in a third mode, according to an embodiment of the disclosure.
Figure 10:
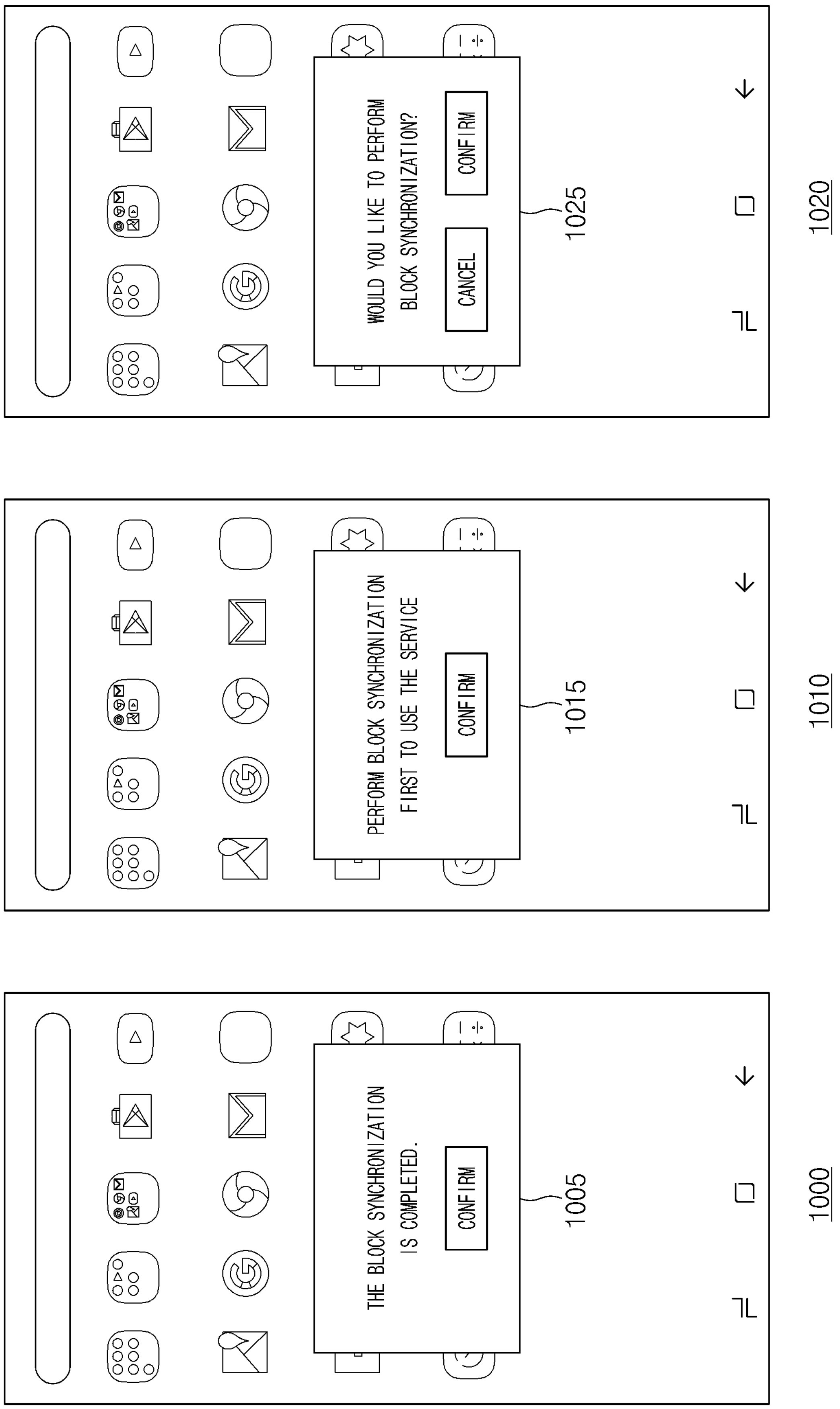
FIG. 10 illustrates a notification provided to an electronic device according to an embodiment of the disclosure.

FIG. 9A is a signal sequence diagram in an electronic device for describing block synchronization, when an electronic device is in a first mode, according to an embodiment of the disclosure. FIG. 9B is a signal sequence diagram in an electronic device for describing block synchronization, when an electronic device is in a second mode, according to an embodiment of the disclosure. FIG. 9C is a signal sequence diagram in an electronic device for describing block synchronization, when an electronic device is in a third mode, according to an embodiment of the disclosure. FIG. 10 illustrates a notification provided to an electronic device according to an embodiment of the disclosure.

Components of FIGS. 2A, 2B, and 3 to 8 may be referenced to describe FIGS. 9A to 9C and 10.

Referring to FIG. 9A, an electronic device 300 may operate in a first mode. In the first mode, the electronic device 300 may perform block synchronization regardless of a communication environment.

In an embodiment, a NAN engine 390 may deliver data (e.g., ACTION_WIFI_AWARE_STATE_CHANGED) indicating that NAN is available to a blockchain module 380 in operation 902. For example, when the electronic device 300 enters an area (e.g., an area 250) where a blockchain service provided by a publisher is provided, operation 902 is performed.

In another embodiment, the blockchain module 380 may request a node mode from a database 445 in operation 904. In response to the request for the node mode, the database 445 may return the node mode to the blockchain module 380 in operation 906. For example, the node mode is a first mode.

In yet another embodiment, the blockchain module 380 may subscribe to the blockchain service through the NAN engine 390 in operation 908. In yet another embodiment, the blockchain module 380 may call attach( ) to the NAN engine 390, and the NAN engine 390 may return WifiAwareSession to the blockchain module 380. In yet another embodiment, the blockchain module 380 may call a subscribe( ) method to subscribe to the blockchain service. In yet another embodiment, the NAN engine 390 may establish a P2P connection with a publisher of the blockchain service.

In yet another embodiment, the blockchain module 380 may perform data exchange with the NAN engine 390 in operation 910. The blockchain module 380 may perform block synchronization through the data exchange.

A description will be given below of the block synchronization. Hereinafter, data transmission and/or reception between the electronic device 300 and one or more external electronic devices may be performed based on the NAN.

In yet another embodiment, a consensus module 440 included in the blockchain module 380 may transmit (or propagate) a sequence number of a last block stored in the electronic device 300 to the one or more external electronic devices included in a network (or a network 200) through the NAN engine 390.

In yet another embodiment, the consensus module 440 may identify the one or more external electronic devices to transmit a sequence number of a last block based on a valid ledger 447. In another embodiment, the consensus module 440 may identify at least one of the one or more external electronic devices based on a list of peers (e.g., the one or more external electronic devices), which is stored in the NAN engine 390. The consensus module 440 may transmit the sequence number of the last block to the identified at least one external electronic device. In another embodiment, the consensus module 440 may receive a response to the synchronization request from the one or more external electronic devices and may verify validation of the response based on a consensus algorithm. The consensus module 440 may identify at least one of the one or more external electronic devices, based on the verified result.

In yet another embodiment, the NAN engine 390 may receive a response signal from at least one of the one or more external electronic devices. The response signal may include the sequence number of the last block, which is stored in at least one electronic device. The NAN engine 390 may deliver the received response signal to the consensus module 440.

In yet another embodiment, the consensus module 440 may identify an external electronic device which transmits the latest block sequence number based on the response signal. The consensus module 440 may transmit a synchronization request to the identified external electronic device through the NAN engine 390.

In yet another embodiment, receiving the synchronization request, the external electronic device may transmit data of blocks after the sequence number of the last block of the electronic device 300 to the electronic device 300. The data of the blocks may be transmitted through a P2P connection between the electronic device 300 and the external electronic device.

In yet another embodiment, the consensus module 440 may store the data of the received blocks in the ledger 447.

When the block synchronization is completed, the blockchain module 380 may provide a notification through the application 710.

Referring to FIG. 10, an application screen 1000 may include a notification 1005 provided to the electronic device in the first mode. For example, the electronic device 300 provides the notification 1005 that the block synchronization is completed on the display 320.

The same reference numerals as reference numerals of FIG. 9A among reference numerals of FIG. 9B may be referenced by the description of FIG. 9A.

Referring to FIG. 9B, the electronic device 300 may operate in a second mode. In the second mode, the blockchain module 380 may perform block synchronization based on a communication environment of the electronic device 300.

In an embodiment, after subscribing to a service in operation 908, the blockchain module 380 may identify a communication network in operation 930 used by the electronic device 300.

In another embodiment, when the electronic device 300 is communicating using a cellular network, the blockchain module 380 may fail to perform block synchronization. The blockchain module 380 may provide a notification that there is a need for the block synchronization in operation 935.

Referring again to FIG. 10, an application screen 1010 may include a notification 1015 provided to the electronic device in the second mode. For example, when the electronic device 300 is using the cellular network, it provides the notification 1015 that there is the need for the block synchronization on the display 320.

Referring again to FIG. 9B, when the electronic device 300 is communicating using the Wi-Fi network, the blockchain module 380 may perform block synchronization. A description of the block synchronization may be referenced by the description of FIG. 9A. in an embodiment, when the block synchronization is completed, the blockchain module 380 may provide a notification (e.g., a notification 1005) by means of the application 710 in operation 920.

The same reference numerals as reference numerals of FIG. 9A among reference numerals of FIG. 9C may be referenced by the description of FIG. 9A.

Referring to FIG. 9C, the electronic device 300 may operate in a third mode. In the third mode, the blockchain module 380 may provide a notification (or a UI) for identifying whether to perform block synchronization. The blockchain module 380 may perform the block synchronization based on a user input to the notification (or the UI).

In yet another embodiment, the blockchain module 380 may subscribe to a service in operation 908 and may provide the application 710 with a notification for identifying whether to perform the block synchronization in operation 940.

Referring again to FIG. 10, an application screen 1020 may include the notification 1025 provided to the electronic device in the third mode. The electronic device 300 display the notification 1025 for identifying whether to perform block synchronization on the display 320. The electronic device 300 may receive a user input to the notification 1025.

Referring again to FIG. 9C, the blockchain module 380 may perform the block synchronization, based on the user input to the notification 1025. A description of the block synchronization may be referenced by the description of FIG. 9A. in yet another embodiment, when the block synchronization is completed, the blockchain module 380 may provide a notification (e.g., the notification 1005) by means of the application 710 in operation 920.

Hereinafter, a description will be given of generation of a transaction (or a block) after the block synchronization.

In yet another embodiment, the transaction generated by the smart contract 420 may be delivered to the consensus module 440. The consensus module 440 may deliver a request to verify validation of the transaction to the NAN engine 390. The NAN engine 390 may transmit the request to verify the validation to at least one external electronic device (e.g., a blockchain node) included in the network.

In yet another embodiment, the at least one external electronic device may verify the validation of the transaction, in response to the received request to verify the validation. The at least one external electronic device may transmit a response signal including approval or denial for the transaction to the electronic device 300 based on the result of verifying the validation.

In yet another embodiment, the consensus module 440 may receive a response signal from at least some of the at least one external electronic device. In another embodiment, when the number of nodes included in the network 200 is less than the number of nodes necessary for consensus, the consensus module 440 may make a consensus of the transaction by means of at least one external server outside the network 200. For example, the electronic device included in the network 200 and the at least one external server participates in the consensus of the transaction. In another embodiment, when the number of nodes included in the network 200 is less than the number of nodes necessary for consensus, the consensus module 440 may make a consensus of the transaction by means of at least one external electronic device configuring a local network including the external server. For example, the electronic device included in the network 200 and the at least one external electronic device configuring the local network including the external server participates in the consensus of the transaction. In yet another embodiment, the number of nodes necessary for consensus may be determined by a consensus algorithm (e.g., a practical byzantine fault tolerance algorithm (PBFT), a proof of work (PoW) algorithm, a proof of stake (PoS) algorithm, or a delegated PoS algorithm).

In yet another embodiment, at least a certain rate or more (e.g., ⅔ or more) of at least one node which participates in the consensus of the transaction makes a consensus in generating the transaction, the consensus module 440 may identify that the generated transaction is valid. In yet another embodiment, the consensus module 440 may generate a new block and may store the valid transaction in the generated block. In yet another embodiment, the consensus module 440 may store the generated block in the ledger 447.

In yet another embodiment, the electronic device 300 may propagate the generated block to one or more external electronic devices included in the network through the NAN engine 390.

Figure 11:
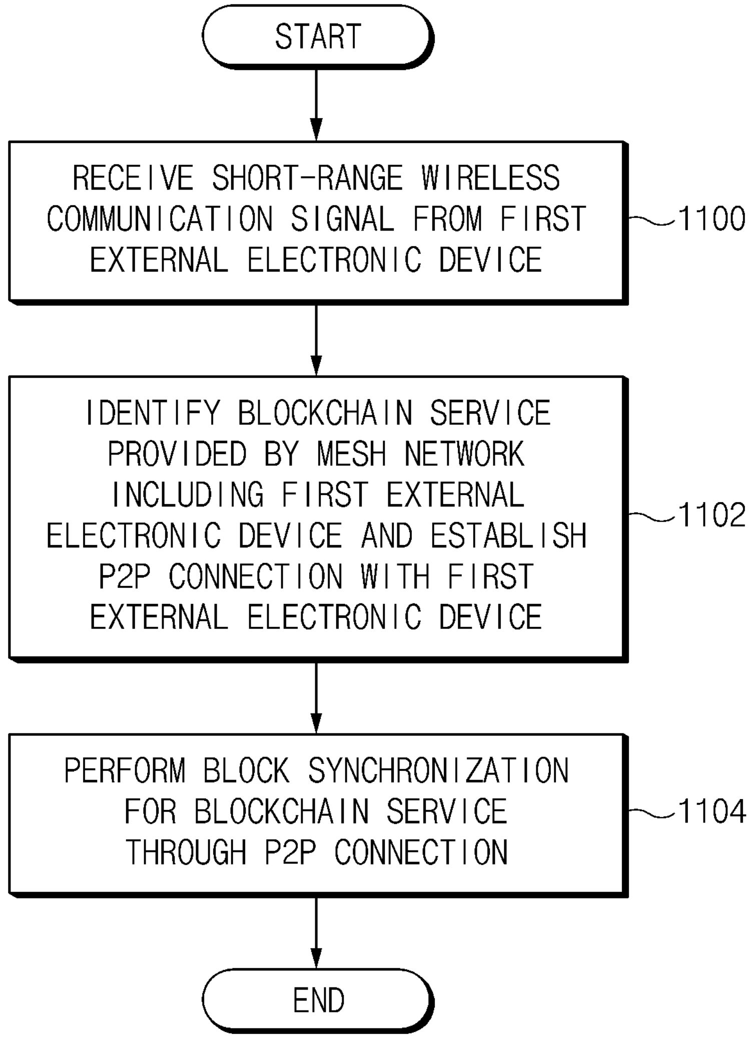
FIG. 11 is a flowchart for describing block synchronization of an electronic device according to an embodiment of the disclosure.

FIG. 11 is a flowchart for describing block synchronization of an electronic device according to an embodiment of the disclosure.

Components of FIGS. 2A, 2B, 3 to 8, 9A to 9C, and 10 may be referenced to describe FIG. 11.

Referring to FIG. 11, in operation 1100, an electronic device 300 may receive a short-range wireless communication signal from a first external electronic device (e.g., one or more external electronic devices (e.g., 210, 220, and 230)). For example, in operation 1100, the first external electronic device operates as a publisher.

In an embodiment, the short-range wireless communication signal may be based on a NAN protocol. In another embodiment, the short-range wireless communication signal may include information associated with an aware service. For example, the short-range wireless communication signal includes a publish message of the aware service. In this case, the electronic device 300 may operate as a subscriber.

In operation 1102, the electronic device 300 may identify a blockchain service provided by a mesh network including the first external electronic device based on the wireless communication signal received from the first external electronic device and may establish a P2P connection with the first external electronic device.

In yet another embodiment, the electronic device 300 may operate as a blockchain node in the mesh network. For example, the electronic device 300 needs to perform block synchronization to use a blockchain service.

In operation 1104, the electronic device 300 may perform the block synchronization for the blockchain service through the P2P connection. A description of the block synchronization may be referenced by the description of FIG. 9A.

Figure 12:
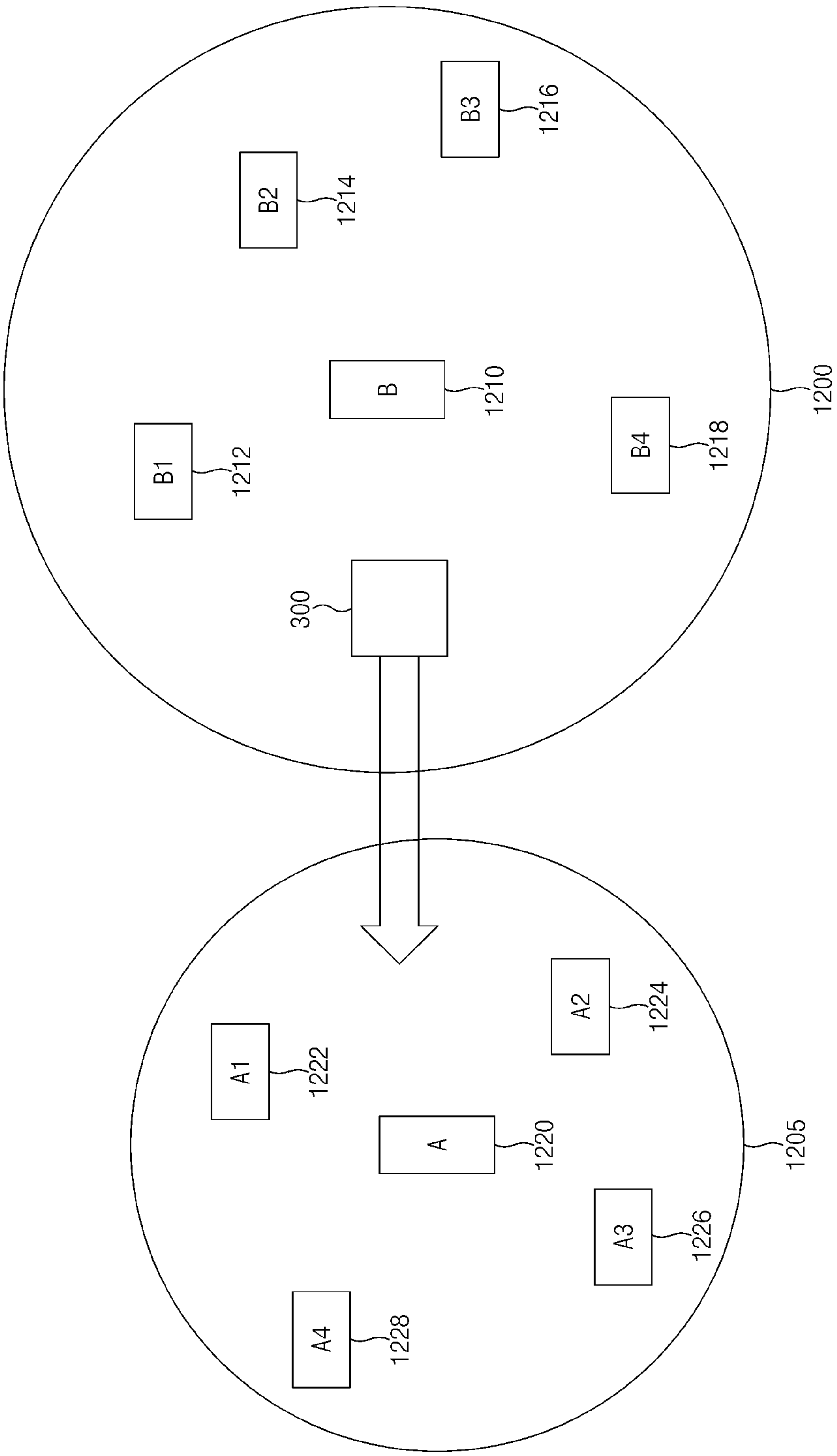
FIG. 12 illustrates network movement of an electronic device according to an embodiment of the disclosure.

FIG. 12 illustrates network movement of an electronic device according to an embodiment of the disclosure.

Components of FIGS. 2A, 2B, 3 to 8, 9A to 9C, 10, and 11 may be referenced to describe FIG. 12.

Referring to FIG. 12, in an embodiment, an electronic device 300 may configure a first network with one or more external electronic devices 1210, 1212, 1214, 1216, and 1218. The first network may be based on a P2P connection between the electronic device 300 and the one or more external electronic devices 1210, 1212, 1214, 1216, and 1218. The P2P connection may be based on NAN.

In another embodiment, a first aware service area provided by the first network may be a first area 1200. For example, the first area 1200 is an area where an SDF transmitted by the external electronic device 1210 is reached.

In yet another embodiment, the external electronic device 1210 may be a publisher which publishes a first aware service. The electronic device 300 may be a subscriber which subscribes to the first aware service.

In yet another embodiment, the electronic device 300 may use a first blockchain service provided by the first network. Blocks of the electronic devices 300, 1210, 1212, 1214, 1216, and 1218 included in the first network may be synchronized in conjunction with the first blockchain service.

In yet another embodiment, the one or more external electronic devices 1210, 1212, 1214, 1216, and 1218 may configure a second network. In yet another embodiment, an area of a second aware service provided by the second network may be a first area 1200. In yet another embodiment, the external electronic device 1220 may be a publisher of the second aware service. In yet another embodiment, blocks of the one or more external electronic devices 1210, 1212, 1214, 1216, and 1218 included in the second network may be synchronized in conjunction with a second blockchain service.

In yet another embodiment, the electronic device 300 using the first blockchain service may enter the second area 1205. In this case, the electronic device 300 may not use the first blockchain service any longer.

In yet another embodiment, the electronic device 300 may receive a subscribe message from the external electronic device 1220. The electronic device 300 may establish a P2P connection with the external electronic device 1220. In yet another embodiment, the electronic device 300 may use the second blockchain service provided in the second area 1205 based on the P2P connection. For example, the electronic device 300 performs block synchronization with at least some of the one or more external electronic devices 1220, 1222, 1224, 1226 and 1228 included in the second network through the P2P connection.

Referring to FIG. 12, the electronic device 300 may use another blockchain service depending on the area where the electronic device 300 is located.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device, comprising:

a wireless communication circuit;

memory storing one or more computer programs; and one or more processors communicatively coupled to the wireless communication circuit and the memory, wherein the one or more computer programs include computer-executable instructions that, when executed by the one or more processors individually or collectively, cause the electronic device to:

receive a short-range wireless communication signal from a first external electronic device, and based on the short-range wireless communication signal:

identify, from among a plurality of blockchain services, a blockchain service provided by a mesh network, wherein the mesh network includes a plurality of external electronic devices including a first external electronic device;

establish a peer-to-peer (P2P) connection with the first external electronic device;

perform block synchronization for the identified blockchain service through the P2P connection; and when performing the block synchronization:

request a latest sequence number from each of the plurality of external electronic devices, wherein the latest sequence number corresponds to a sequence number of a block corresponding to the identified blockchain service last stored in the each of the plurality of external electronic devices, wherein the sequence number used to synchronize the electronic device and the plurality of external electronic devices for the block;

receive the latest sequence number from the each of the plurality of external electronic devices;

identify, by determining a highest sequence number from among latest sequence numbers received by the electronic device from each of the plurality of external electronic devices, a second external electronic device which transmits the determined highest sequence number among the plurality of external electronic devices;

based on the identifying, by the determining of the highest sequence number from among the latest sequence numbers received by the electronic device from each of the plurality of external electronic devices, the second external electronic device, request synchronization block data from the second external electronic device; and perform the block synchronization for the identified blockchain service based on the synchronization block data received from the second external electronic device.

2. The electronic device of claim 1, wherein the short-range wireless communication signal is based on a Wi-Fi neighbor awareness networking (NAN) protocol.

3. The electronic device of claim 1, wherein the one or more computer programs further include computer-executable instructions that, when executed by the one or more processors individually or collectively, cause the electronic device to:

establish a P2P connection with the second external electronic device, based on requesting the synchronization block data, and receive the synchronization block data through the P2P connection.

4. The electronic device of claim 3, wherein the synchronization block data includes data of blocks after the latest sequence number of the electronic device.

5. The electronic device of claim 4, wherein the one or more computer programs further include computer-executable instructions that, when executed by the one or more processors individually or collectively, cause the electronic device to:

update a ledger stored in the memory, based on the synchronization block data.

6. The electronic device of claim 1, wherein the one or more computer programs further include computer-executable instructions that, when executed by the one or more processors individually or collectively, cause the electronic device to:

identify a synchronization mode of the electronic device based on a user input, and perform the block synchronization based on the synchronization mode.

7. The electronic device of claim 6, further comprising:

a display, wherein the one or more computer programs further include computer-executable instructions that, when executed by the one or more processors individually or collectively, cause the electronic device to:

provide the display with a notification associated with the block synchronization.

8. The electronic device of claim 1, wherein the one or more computer programs further include computer-executable instructions that, when executed by the one or more processors individually or collectively, cause the electronic device to:

use a first blockchain service in a first mesh network, receive a short-range wireless communication signal from a third external electronic device, while using the first blockchain service, and based on the short-range wireless communication signal received from the third external electronic device:

identify a second blockchain service provided by a second network separated from the first mesh network, wherein the second network includes a plurality of external devices including the third external electronic device;

establish a P2P connection with the third external electronic device; and perform block synchronization for the second blockchain service through the P2P connection established with the third external electronic device, when performing the block synchronization:

request a latest sequence number from each of the plurality of external devices included in the second network;

receive the latest sequence number from the each of the plurality of external devices included in the second network;

identify, by determining a highest sequence number from among latest sequence numbers respectively received from the plurality of external devices included in the second network, a fourth external electronic device which transmits the determined highest sequence number among the plurality of external devices included in the second network;

based on the identifying the fourth external electronic device, request synchronization block data from the fourth external electronic device; and perform the block synchronization for the second blockchain service based on the synchronization block data received from the fourth external electronic device.

9. A method performed by an electronic device, the method comprising:

receiving, by the electronic device, a short-range wireless communication signal from a first external electronic device; and based on the short-range wireless communication signal:

identifying, by the electronic device, from among a plurality of blockchain services, a blockchain service provided by a mesh network, wherein the mesh network includes a plurality of external electronic devices including the first external electronic device;

establishing, by the electronic device, a peer-to-peer (P2P) connection with the first external electronic device; and performing, by the electronic device, block synchronization for the identified blockchain service through the P2P connection, wherein the performing of the block synchronization includes:

requesting a latest sequence number from each of the plurality of external electronic devices, wherein the latest sequence number corresponds to a sequence number of a block corresponding to the identified blockchain service last stored in the each of the plurality of external electronic devices;

receiving the latest sequence number from the each of the plurality of external electronic devices;

identifying, by determining a highest sequence number from among latest sequence numbers received by the electronic device from each of the plurality of external electronic devices, a second external electronic device which transmits the determined highest sequence number among the plurality of external electronic devices;

based on the identifying, by the determining of the highest sequence number from among the latest sequence numbers received by the electronic device from each of the plurality of external electronic devices, the second external electronic device, requesting synchronization block data from the second external electronic device; and performing the block synchronization for the identified blockchain service based on the synchronization block data received from the second external electronic device.

10. The method of claim 9, wherein the short-range wireless communication signal is based on a Wi-Fi neighbor awareness networking (NAN) protocol.

11. The electronic device of claim 1, wherein the electronic device stores all blocks generated in the blockchain service provided by the mesh network.

12. The method of claim 9, further comprising:

establishing a P2P connection with the second external electronic device, based on requesting the synchronization block data; and receiving the synchronization block data through the P2P connection.

13. The method of claim 12, wherein the synchronization block data includes data of blocks after the latest sequence number of the electronic device.

14. The method of claim 13, further comprising:

updating a ledger, based on the synchronization block data.

15. The method of claim 9, further comprising:

identifying a synchronization mode of the electronic device based on a user input; and performing the block synchronization based on the synchronization mode.

16. The method of claim 15, further comprising:

providing a notification associated with the block synchronization.

17. The method of claim 9, further comprising:

using a first blockchain service in a first mesh network;

receiving a short-range wireless communication signal from a third external electronic device operating, while using the first blockchain service; and based on the short-range wireless communication signal received from the third external electronic device:

identifying a second blockchain service provided by a second network separated from the first mesh network, establishing a P2P connection with the third external electronic device, and performing block synchronization for the second blockchain service through the P2P connection established with the third external electronic device, wherein the performing of the block synchronization for the second blockchain service includes:

requesting a latest sequence number from each of the plurality of external electronic devices included in the second network;

receiving the latest sequence number from the each of the plurality of external electronic devices included in the second network;

identifying, by determining a highest sequence number from among latest sequence numbers respectively received from the plurality of external electronic devices included in the second network, a fourth external electronic device which transmits the determined highest sequence number among the plurality of external electronic devices included in the second network;

based on the identifying the fourth external electronic device, requesting synchronization block data from the fourth external electronic device; and performing the block synchronization for the second blockchain service based on the synchronization block data received from the fourth external electronic device.

* * * * *